(12) United States Patent
Anderson et al.

(10) Patent No.: US 9,003,413 B1
(45) Date of Patent: Apr. 7, 2015

(54) THREAD SYNCHRONIZATION BY TRANSITIONING THREADS TO SPIN LOCK AND SLEEP STATE

(75) Inventors: Jason H. Anderson, Toronto (CA); Taneem Ahmed, Toronto (CA); Sandor S. Kalman, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 994 days.

(21) Appl. No.: 12/568,558

(22) Filed: Sep. 28, 2009

(51) Int. Cl.
*G06F 9/46* (2006.01)
*H04L 12/26* (2006.01)

(52) U.S. Cl.
CPC .................................. *H04L 12/2634* (2013.01)

(58) Field of Classification Search
USPC ........................................................ 718/102
See application file for complete search history.

(56) References Cited

U.S. PATENT DOCUMENTS

| | | | | |
|---|---|---|---|---|
| 5,193,186 A | * | 3/1993 | Tamaki et al. | 718/106 |
| 5,327,419 A | * | 7/1994 | Clark et al. | 370/363 |
| 7,383,368 B2 | * | 6/2008 | Schopp | 710/200 |
| 7,904,673 B2 | * | 3/2011 | Riska et al. | 711/154 |
| 2010/0257516 A1 | * | 10/2010 | Roediger et al. | 717/155 |

* cited by examiner

*Primary Examiner* — Meng An
*Assistant Examiner* — Wissam Rashid
(74) *Attorney, Agent, or Firm* — Robert M. Brush; Gerald Chan

(57) ABSTRACT

A method, apparatus, and computer readable medium for synchronizing a main thread and a slave thread executing on a processor system are disclosed. For example, the method includes the following elements: transitioning the slave thread from a sleep state to a spin-lock state in response to a wake-up message from the main thread; transitioning the slave thread out of the spin-lock state to process a first work unit from the main thread; determining, at the main thread, an elapsed time period until receipt of a second work unit for the slave thread; transitioning the slave thread to the spin-lock state if the elapsed time period satisfies a threshold time period; and transitioning the slave thread to the sleep state if the elapsed time period does not satisfy the threshold time period.

17 Claims, 6 Drawing Sheets

THREAD SYNCHRONIZATION BY TRANSITIONING THREADS TO SPIN LOCK AND SLEEP STATE

FIELD OF THE INVENTION

One or more aspects of the present invention relate generally to integrated circuit design and, more particularly, to a method and apparatus for providing a thread synchronization model.

BACKGROUND OF THE INVENTION

The broad availability of multi-core microprocessors has made multi-threaded software applications commonplace. In such applications, a program spawns multiple execution "threads" that run in parallel on different central processing units (CPUs) or different "cores" in the microprocessor in order to accelerate computation. An operating system (OS) typically manages different threads executed on the microprocessor. In particular, an OS can decide how threads are bound to processor cores and for how long a thread may execute on a processor core.

In general, threads may be "sleeping" or "active", depending on whether or not they are executing on a processor at a given moment. Multi-threaded applications typically place their execution threads into a sleeping state when the threads are not required to do work. The OS can wake up sleeping threads when work is available. In modern microprocessors, it can take between 20 and 60 microseconds, on average, for the OS to respond to a wake up request and bring a sleeping thread into the active state. Thus, there must be a sufficient amount of work for the thread to perform in order to justify this wake-up time overhead. Otherwise, the overhead contributes to inefficiency, potentially eliminating any gain achieved by multi-threading.

In some cases, a thread does not transition to a sleep state when there is no work to perform, but rather enters a loop to stay active (referred to as "spinning"). The thread "spins" until there is work to be performed. In general, spinning requires the thread to repeatedly check whether there is work to do. However, such spinning is not desirable from the perspective of efficient processor usage, since the processor is consumed in maintaining the spinning thread. Thus, a processor maintaining a spinning thread at best has a reduced capacity to handle more meaningful tasks, and at worst is unavailable to perform such tasks while the thread is spinning.

Accordingly, there exists a need in the art for an improved method and apparatus for providing a thread synchronization model that overcomes the aforementioned disadvantages.

SUMMARY OF THE INVENTION

Some embodiments of the invention relate to a method and computer readable medium for synchronizing a main thread and a slave thread each executing on a processor system. The method, and computer readable medium having instructions that when executed by a processor perform the method, can include: transitioning the slave thread from a sleep state to a spin-lock state in response to a wake-up message from the main thread; transitioning the slave thread out of the spin-lock state to process a first work unit from the main thread; determining, at the main thread, an elapsed time period until receipt of a second work unit for the slave thread; transitioning the slave thread to the spin-lock state if the elapsed time period satisfies a threshold time period; and transitioning the slave thread to the sleep state if the elapsed time period does not satisfy the threshold time period.

In some embodiments, the method, and computer readable medium having instructions that when executed by a processor perform the method, can further include: obtaining an initial work unit at the main thread; dividing the initial work unit into the first work unit and another work unit; sending the first work unit from the main thread to the slave thread; and processing the other work unit at the main thread.

In some embodiments, the method, and computer readable medium having instructions that when executed by a processor perform the method, can further include: receiving, at the main thread, the first work unit as processed by the slave thread; and combining, at the main thread, the other work unit as processed by the main thread with the first work unit as processed by the slave thread.

In some embodiments, the method, and computer readable medium having instructions that when executed by a processor perform the method, can further include: sending the second work unit from the main thread to the slave thread; and transitioning the slave thread out of the spin-lock state to process the second work unit, wherein the elapsed time period satisfies the threshold time period.

In some embodiments, the method, and computer readable medium having instructions that when executed by a processor perform the method, can further include: dividing, at the main thread, an initial work unit into the second work unit and a third work unit; and processing the third work unit at the main thread.

In some embodiments, the method, and computer readable medium having instructions that when executed by a processor perform the method, can further include: receiving, at the main thread, the second work unit as processed by the slave thread; and combining, at the main thread, the third work unit as processed by the main thread with the second work unit as processed by the slave thread.

In some embodiments, the method, and computer readable medium having instructions that when executed by a processor perform the method, can further include: transitioning the slave thread from the sleep state to the spin-lock state in response to another wake-up message from the main thread; and transitioning the slave thread out of the spin-lock state to process a third work unit from the main thread, wherein the elapsed time period does not satisfy the threshold time period.

Another embodiment of the invention relates to an apparatus that can include: a processor system having a first processor configured to execute a main thread and a second processor configured to execute a slave thread; and a memory storing program instructions that when executed by the processor system are configured to: transition the slave thread from a sleep state to a spin-lock state in response to a wake-up message from the main thread; transition the slave thread out of the spin-lock state to process a first work unit from the main thread; determine, at the main thread, an elapsed time period until receipt of a second work unit for the slave thread; and transition the slave thread to the spin-lock state if the elapsed time period satisfies a threshold time period, or to the sleep state if the elapsed time period does not satisfy the threshold time period.

In this embodiment, the processor system can comprise a microprocessor, the first processor can comprise a first core of the microprocessor, and the second processor can comprise a second core of the microprocessor. In this embodiment, the first processor can comprise a first microprocessor and the second processor can comprise a second microprocessor. In this embodiment, the program instructions can be further configured to: obtain an initial work unit at the main thread;

divide the initial work unit into the first work unit and another work unit; send the first work unit from the main thread to the slave thread; and process the other work unit at the main thread. In this embodiment, the program instructions can be further configured to: receive, at the main thread, the first work unit as processed by the slave thread; and combine, at the main thread, the other work unit as processed by the main thread with the first work unit as processed by the slave thread. In this embodiment, the program instructions can be further configured to: send the second work unit from the main thread to the slave thread; and transition the slave thread out of the spin-lock state to process the second work unit. In this embodiment, the program instructions can be further configured to: transition the slave thread from the sleep state to the spin-lock state in response to another wake-up message from the main thread; and transition the slave thread out of the spin-lock state to process a third work unit from the main thread.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
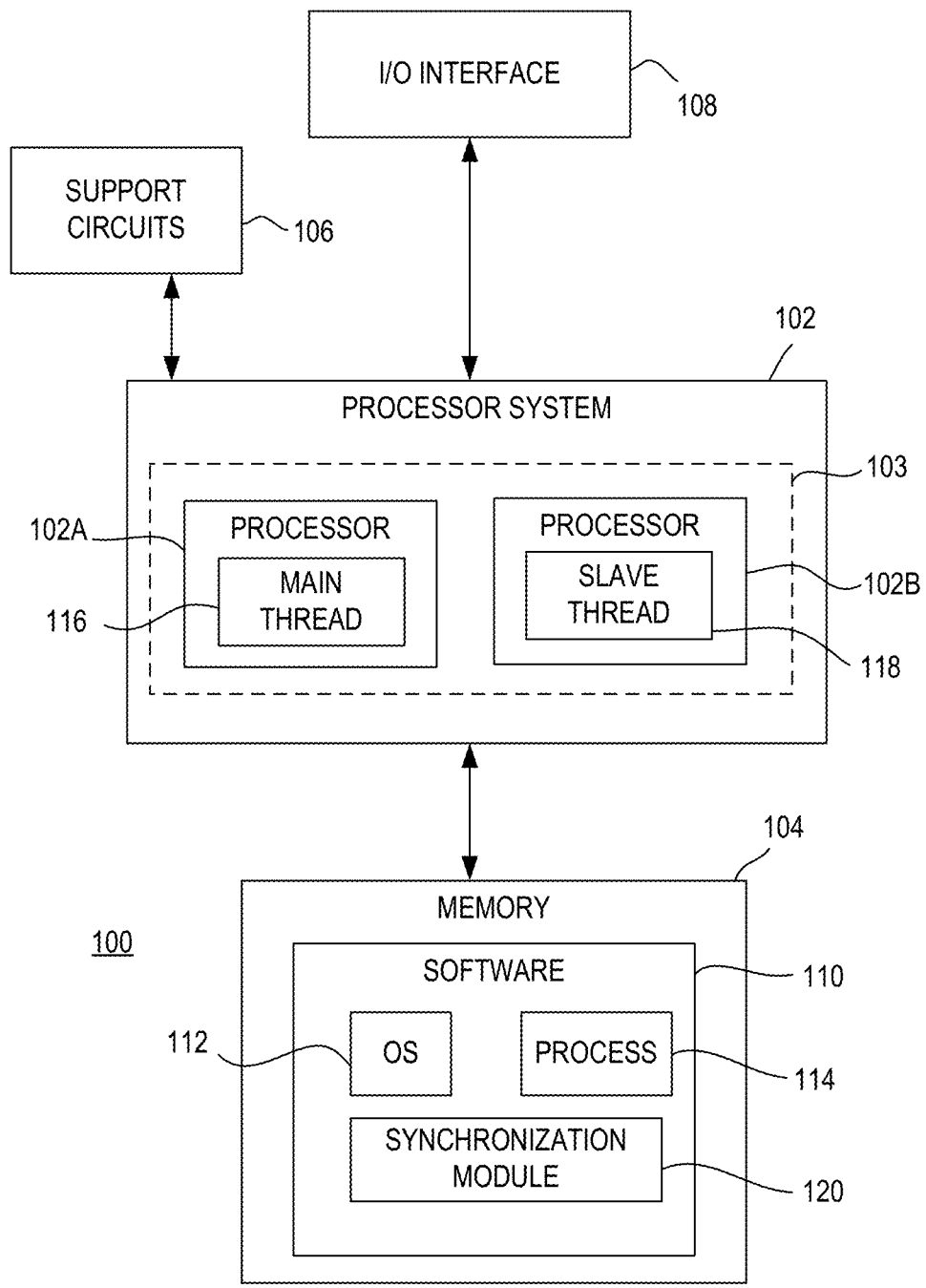
FIG. 1 is a block diagram depicting a computing system according to an embodiment of the invention.

FIG. 1 is a block diagram depicting a computing system 100 according to an embodiment of the invention. The system 100 includes a processor system 102, a memory 104, various support circuits 106, and an I/O interface 108. In general, the processor system 102 may include one or more processors. A processor includes a circuit configured to execute program instructions. A processor may also be referred to as a central processing unit (CPU). For purposes of clarity by example, the processor system 102 is shown with two processors 102A and 102B. Processor(s) in the processor system 102 can be implemented using one or microprocessors, each of which can include one or more independent cores. A microprocessor generally includes one or more processors on a single integrated circuit (IC). A microprocessor that includes more than one processor is referred to as a multi-core microprocessor, where each independent processor is referred to as a core. For purposes of clarity by example, the processors 102A and 102B are shown as two cores in a microprocessor 103. It is to be understood that the processors 102A and 102B can also be implemented using two separate microprocessors in the processor system 102.

The support circuits 106 for the processor system 102 include conventional cache, power supplies, clock circuits, data registers, I/O interfaces, and the like. The I/O interface 108 may be directly coupled to the memory 104 or coupled through the processor system 102. The memory 104 may include one or more of the following random access memory, read only memory, magneto-resistive read/write memory, optical read/write memory, cache memory, magnetic read/write memory, and the like.

The memory 104 stores software 110 that includes program instructions configured for execution by the processor system 102. The software 110 can include an operating system (OS) 112 and a process 114. The OS 112 provides an interface between the process 114 and the processor system 102. The OS 112 may be implemented using various operating systems known in the art. The process 114 can be executed by the processor system 102 under control of the OS 112 to perform work. For purposes of clarity by example, a single process 114 is shown, but it is to be understood that the software 110 can include multiple processes for execution by the processor system 102 under control of the OS 112.

The process 114 can include a plurality of threads for performing different units of work ("work units"). The process 114 and the OS 112 can cooperate to distribute execution of the threads among different processors in the processing system. For example, in the present embodiment, the process 114 can include two threads referred to as a main thread 116 and a slave thread 118. The main thread 116 can be executed on the processor 102A and the slave thread can be executed on the processor 102B. In general, the main thread 116 obtains and processes work units. The main thread 116 can use the slave thread 118 to process particular work units or portions thereof on its behalf. The software 110 includes a synchronization module 120 configured to synchronize execution of threads, including the main thread 116 and the slave thread 118. The synchronization module 120 includes program instructions executable by the processor system 102 and can be implemented in the OS 112, the process 114, or using a combination of the OS 112 and the process 114. Operation of the synchronization module 120 is described below.

Figure 2A:
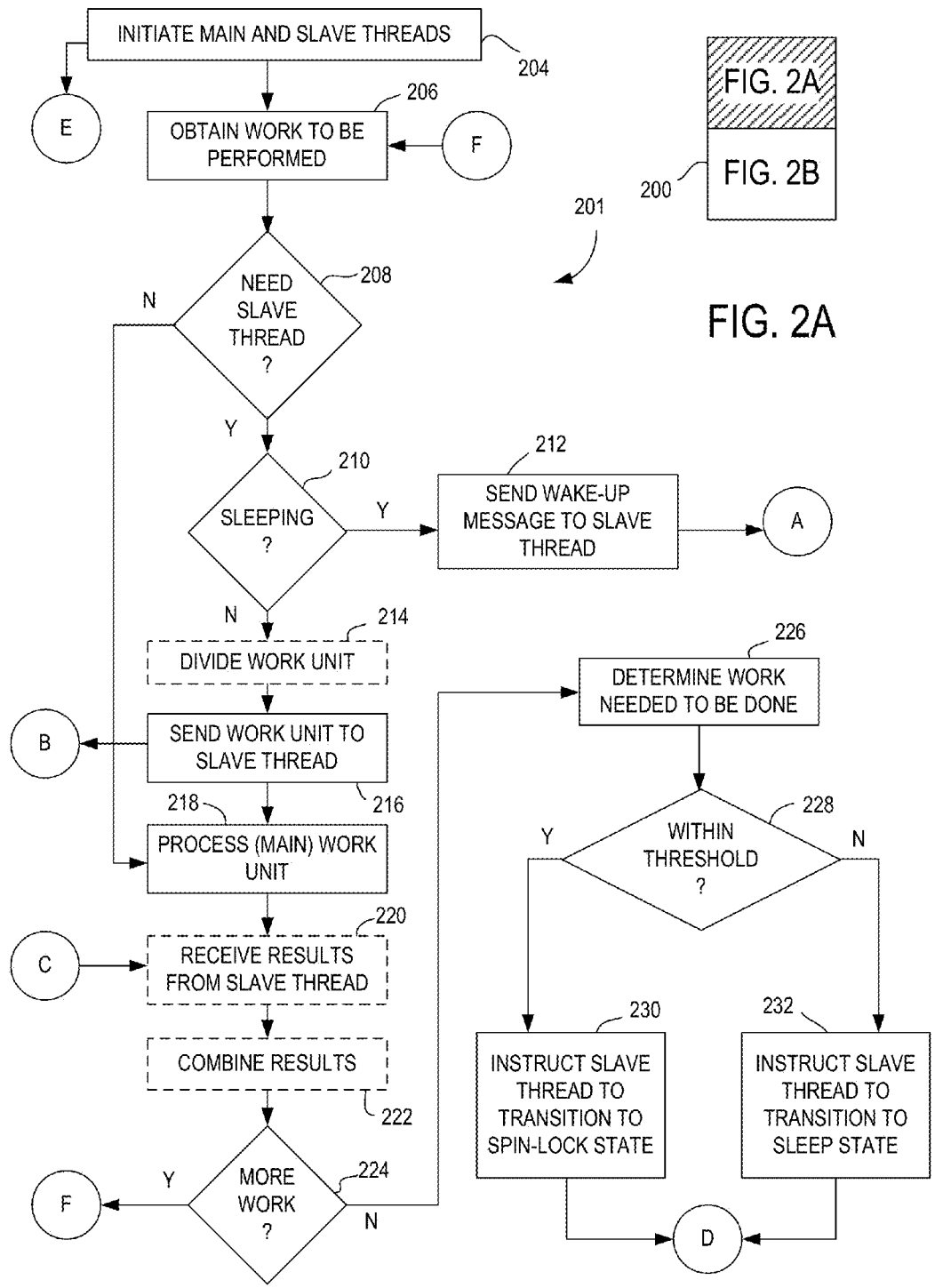
FIGS. 2A and 2B show a flow diagram of a method of thread synchronization according to an embodiment of the invention.
Figure 2B:
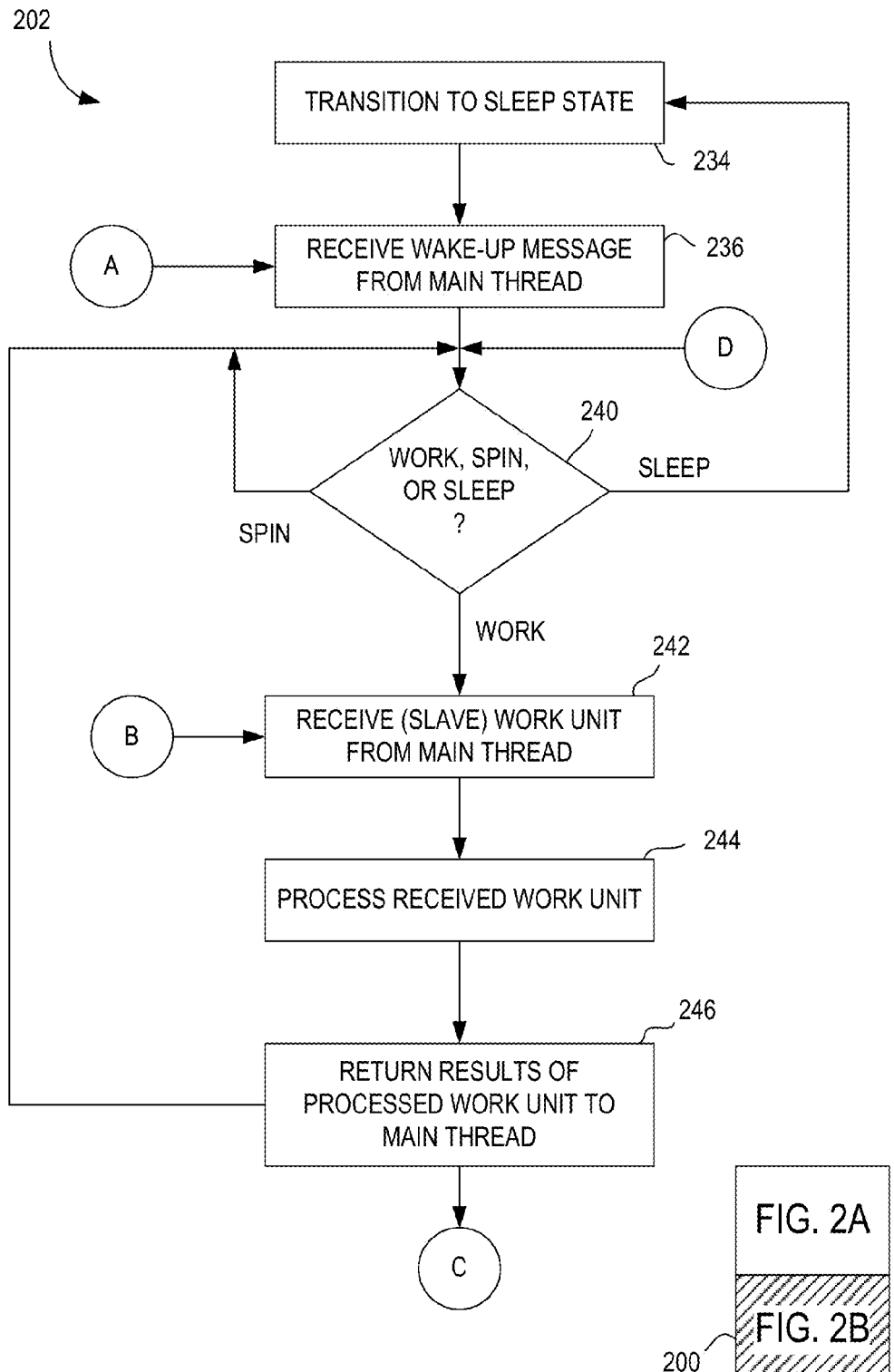

FIGS. 2A and 2B show a flow diagram of a method 200 of thread synchronization according to some embodiments of the invention. The method 200 may be performed by the synchronization module 120 described above. For purposes of clarity by example, the method 200 is described with respect to synchronizing the main thread 116 and the slave thread 118 shown in FIG. 1. The method 200 includes a method 201 performed by the main thread 116, and a method 202 performed by the slave thread 118.

The method 200 begins at step 204, where the process 114 initiates the main thread 116 and the slave thread 118. The method 200 then proceeds to both the method 201 and the method 202. The method 201 begins at step 206, where the main thread 116 obtains work to be performed. At step 208, the main thread 116 determines whether the slave thread 118 is needed to complete the work. If not, the method 200 proceeds to step 218. If so, the method 200 proceeds to step 210. At step 210, the main thread 116 determines whether the slave thread 118 is sleeping. If so, the method 200 proceeds to step 212, where the main thread 116 sends a wake-up message to the slave thread 118. If the slave thread 118 is not sleeping at step 210, the method 200 proceeds to step 214.

At optional step 214, the main thread 116 divides the work into two separate work units, one for the main thread 116 ("main work unit") and another for the slave thread 118 ("slave work unit"). In some embodiments, the main thread 116 and the slave thread 118 may be designed to divide the work by their functions (e.g., each thread performs a different type of work). In such cases, the main thread does not actually divide the work unit, rather the main thread performs its part of the work and the slave thread performs its part of the work by design. Thus, step 214 is optional.

At step 216, the main thread 116 sends a work unit to the slave thread 118. At step 218, the main thread 116 processes the work unit (main work unit if divided). At optional step 220, the main thread 116 receives results of the processed slave work unit from the slave thread 118. At optional step 222, the main thread 116 combines the results of the processed main work unit with the results of the processed slave work unit. Steps 220 and 222 are optional. For example, steps 220 and 222 are omitted if the slave thread 118 is not needed to perform the work. In another example, the main thread 116 may not be required to combine the results from the slave thread 118 with its results.

At step 224, the main thread 116 determines whether there is more work to do (i.e., whether all of the work received at step 206 has been performed). If so, the method 201 returns to step 206 and repeats. If there is more work to do, the method 201 proceeds to step 226.

At step 226, the main thread 116 determines work needed to be done, but has not yet been received. At step 228, the main thread 116 determines whether additional work will be received within a threshold time period. That is, the main thread 116 determines an elapsed time period until receipt of additional work and compares the elapsed time period with a threshold time period. If additional work will be received within the threshold time period, the method 201 proceeds to step 230, where the main thread 116 instructs the slave thread 118 to transition to a spin-lock state. By "transition to", it is meant that the slave thread will move to destination state when idle (after work is performed) or remain in the destination state if already in such state. If additional work will not be received within the threshold time period, the method 201 proceeds to step 232, where the main thread 116 instructs the slave thread 118 to transition to (or remain in) a sleep state. The method 201 can be repeated for each set of work received by the main thread 116.

The method 202 performed by the slave thread 118 begins at step 234. At step 234, the slave thread transitions to a sleep state. When a thread is in the sleep state, the OS 112 does not allocate a processor to execute the thread (i.e., the thread does not perform work). At step 236, the slave thread 118 receives the wake-up message from the main thread 116. The slave thread 118 then transitions to a spin-lock state. For example, the spin-lock state may be implemented by a step 240, where the slave thread 118 determines whether to work, spin, or sleep. In case of spin, the step 240 is repeated. In case of sleep, the method 202 returns to step 234. In case of work, the method 202 proceeds to step 242.

At step 242, the slave thread 118 receives the work unit (or slave work unit if divided) from the main thread 116. At step 244, the slave thread 118 processes the received work unit. At step 246, the slave thread 118 returns results of the processed work unit to the main thread 116. The method 202 returns to step 240.

The method 200 performed by the synchronization module 120 can efficiently and advantageously process work that includes small and "bursty" work units required to be processed by the slave thread 118. That is, there may be relatively lengthy periods of time when no work is required to be done by the slave thread, followed by periods to time where there are many smaller pieces of work that need to be done in rapid succession. During a work burst, the units of work are small such that the "wake-up" overhead associated with repeatedly waking up a sleeping thread is too long or otherwise eliminates any potential run-time benefit that multi-threading provides. Hence, the synchronization module 120 combines the notions thread sleeping (also referred to as "thread barriers") and thread spin-locking to realize an efficient hybrid solution.

In some embodiments, the synchronization module 120 provides a thread synchronization model, where the slave thread 118 is initially sleeping. At some point, the main thread 116 wakes up the slave thread 118. Upon waking, the slave thread 118 enters a spin-lock and waits for work to be assigned by the main thread 116. Upon receiving work, the slave thread 118 performs the work and returns the results to the main thread 116. After completing work, the slave thread 118 has two options: the slave thread 118 can continue with the spin-lock or the slave thread can go to sleep. The main thread 116 is responsible for deciding whether the slave thread 118 sleeps or remains in a spin-lock. In general, if work units are small and coming in rapid succession, the main thread 116 can direct the slave thread to spin and wait for more work to be assigned. On the other hand, if the main thread 116 determines that there will be an absence of new work for some threshold time period, the main thread 116 can direct the slave thread 118 to sleep, thereby freeing up processor resources for other tasks. Thus, the synchronization module 120 combines the more advantageous aspects of thread barriers and thread spin-locks in order to maximize efficient CPU usage in a multi-core processing system, while also minimizing application run-time.

Figure 3:
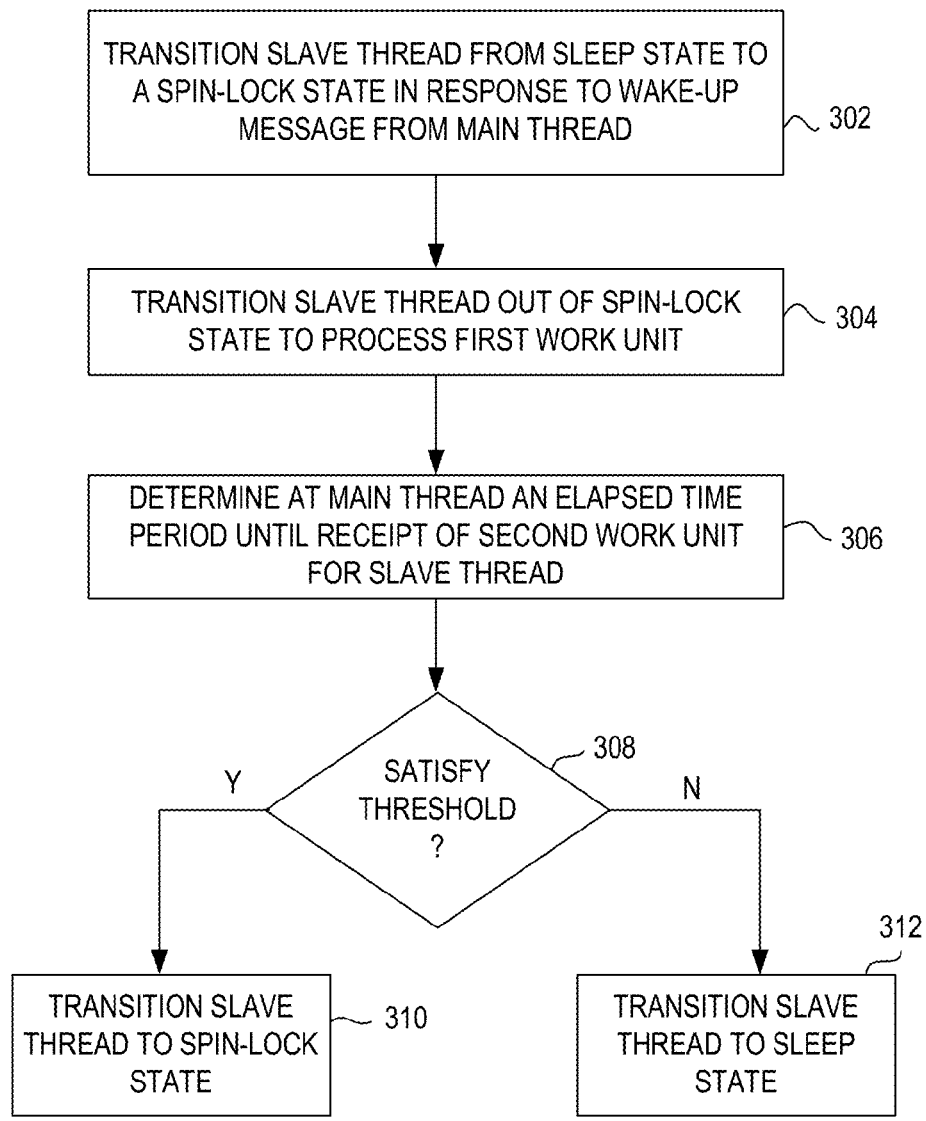
FIG. 3 is a flow diagram depicting a method of synchronizing a main thread with a slave thread each executing on a processor system according to an embodiment of the invention.

FIG. 3 is a flow diagram depicting a method 300 of synchronizing a main thread with a slave thread each executing on a processor system according to an embodiment of the invention. The method 300 begins at step 302, where the slave thread transitions from a sleep state to a spin-lock state in response to a wake-up message from the main thread. At step 304, the slave thread transitions out of the spin-lock state to process a first work unit from the main thread. At step 306, the main thread determines an elapsed time period until receipt of a second work unit for the slave thread. At step 308, the main thread determines whether the elapsed time period satisfies a threshold time period. If the elapsed time period satisfies the threshold time period, the method 300 proceeds to step 310, where the slave thread transitions to the spin-lock state. If the elapsed time period does not satisfy the threshold time period, the method 300 proceeds to step 312, where the slave thread transitions to a sleep state. The method 300 may be repeated to perform additional work.

In some non-limiting embodiments, the thread synchronization model described herein may be used in a placement and routing algorithm for placing and routing a circuit design in an integrated circuit (IC) ("IC design"). The IC may include circuit elements capable of being connected through a programmable interconnection network. Examples of such an IC include field programmable gate arrays (FPGAs), complex programmable logic devices (CPLDs), and the like. During design, nets of the IC design (e.g., connections) are each routed from a source pin to one or more load pins through the interconnection network, where a "pin" is a port or connection of a particular circuit element. The routing algorithm must perform many of such routing operations between a source pin and a load pin. The thread synchronization model described herein can be used to parallelize the routing algorithm, as described in the exemplary embodiment below.

Figure 4A:
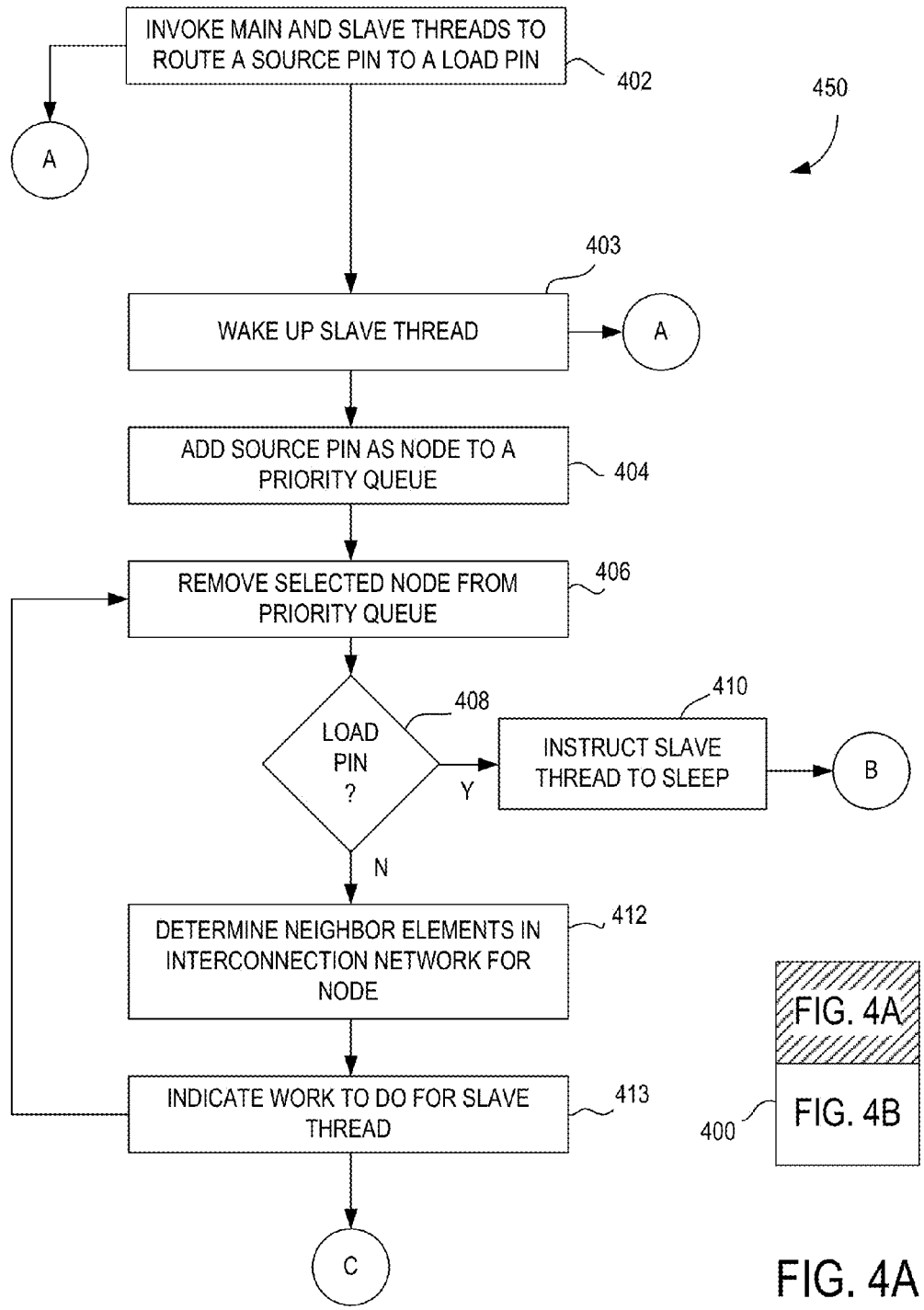
FIGS. 4A and 4B show a flow diagram of a method 400 of parallel routing for an IC design according to an embodiment of the invention.
Figure 4B:
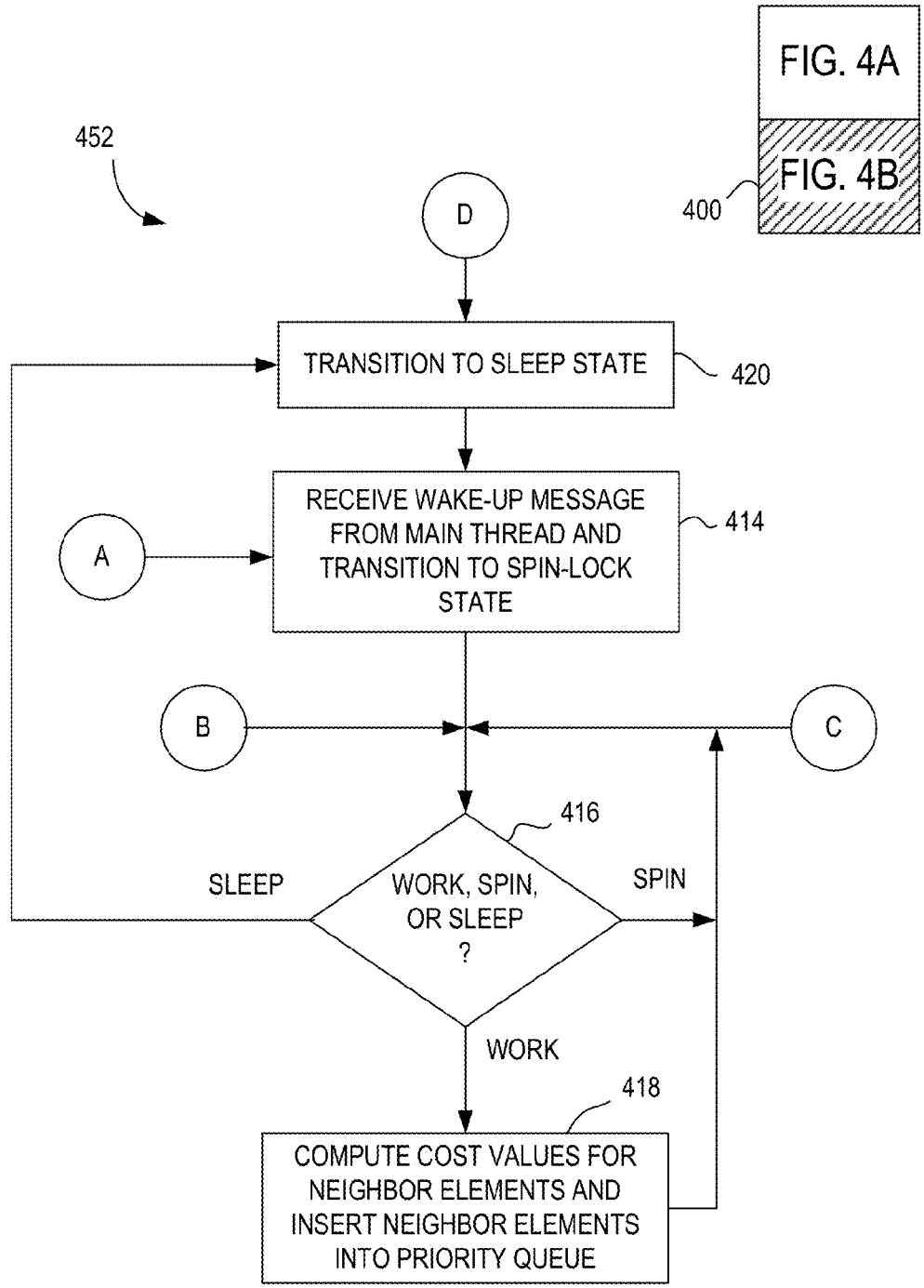

FIGS. 4A and 4B show a flow diagram of a method 400 of parallel routing for an IC design according to an embodiment of the invention. The method 400 provides exemplary use of the thread synchronization model described above. For example, the method 400 may be generally implemented by the process 114 having the main thread 116 and the slave thread 118 and using the thread synchronization module 120. The method 400 includes a method 450 performed by a main thread, and a method 452 performed by a slave thread. The method 400 begins at step 402, a main thread and slave thread are invoked to route a source pin to a load pin. The method 400 proceeds from step 402 to methods 450 and 452.

The method 450 begins at step 403, where the main thread wakes up a slave thread. At step 404, the main thread adds the source pin as a node to a priority queue. At step 406, the main thread removes a selected node from the priority queue. At step 408, the main thread determines whether the selected node is the load pin. If so, the method 450 proceeds to step 410. At step 410, the main thread instructs the slave thread to sleep.

If at step 408 the selected node is not the load pin, the method 450 proceeds to step 412. At step 412, the main thread determines neighbor elements in an interconnection network of the IC for the pin or routing conductor represented by the node. The neighbor elements of the selected node are those routing conductors or pins that may be connected to the selected node by turning on a programmable routing switch. At step 413, the main thread indicates that there is work to do for the slave thread. The indication may be explicit signaling of the slave thread (e.g., sending the slave thread a message), or implicit signaling of the slave thread (e.g., by storing a particular value in memory). The method 450 returns to step 406 from step 413.

The method 452 of the slave thread begins at step 420, where the slave thread transitions to a sleep state. The method 452 moves from step 420 to step 414. At step 414, the slave thread transitions from the sleep state to a spin-lock state in response to a wake up message from the main thread. At step 416, the slave thread determines whether there is work to do, whether to spin, or whether to sleep. In the present example, the slave thread has work to do if the main thread has indicated such (i.e., the main thread has selected a node and iterated through its neighbors). If there is no work to do and no sleep instruction has been received, the method 452 continues with the spin-lock. If there is work to do, the method 452 proceeds to step 418. At step 418, the slave thread computes cost values for the neighbor elements and inserts the neighbor elements into the priority queue for a selected node. That is, neighbor elements are inserted into the priority queue at a particular cost, where the cost can represent delay, capacitance, congestion, or like type metrics. The method 452 returns to step 416 from step 418. If at step 416 the slave thread receives a message from the main thread to sleep, the method 452 proceeds to step 420, where the slave thread transitions to the sleep state.

Accordingly, it can be seen that in the method 400, the main thread extracts a node from the priority queue and iterates through its neighbors, while the slave thread does costing and queue insertion for the previously extracted node. When not doing costing and queue insertion, the slave thread is kept spinning until the main thread indicates there is work to do for costing and queue insertion. At the end of routing a source pin to a load pin, the main thread instructs the slave thread to sleep. The slave thread can be re-awakened when routing for a new load pin is initiated (i.e., the method 400 can be repeated for a different source/load pin pair. Note that in the method 400 the main thread and the slave thread are doing different types of work.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method of synchronizing a main thread and a slave thread, comprising:
   obtaining an initial work unit at the main thread;
   dividing the initial work unit into a first work unit and another work unit;
   sending, via a wake-up message, the first work unit from the main thread to the slave thread; and
   processing the other work unit at the main thread;
   transitioning the slave thread from a sleep state to a spin-lock state in response to the wake-up message from the main thread;
   transitioning the slave thread out of the spin-lock state to process the first work unit from the main thread;
   determining, at the main thread that executes on a processor, an elapsed time period until receipt of a second work unit for the slave thread, wherein the act of determining the elapsed time period is performed before the receipt of the second work unit;
   transitioning the slave thread to the spin-lock state if the elapsed time period satisfies a threshold time period; and
   transitioning the slave thread to the sleep state if the elapsed time period does not satisfy the threshold time period.

2. The method of claim 1, further comprising:
   receiving, at the main thread, the first work unit as processed by the slave thread; and
   combining, at the main thread, the other work unit as processed by the main thread with the first work unit as processed by the slave thread.

3. The method of claim 1, wherein the elapsed time period satisfies the threshold time period, and the method further comprises:
   sending the second work unit from the main thread to the slave thread; and transitioning the slave thread out of the spin-lock state to process the second work unit.

4. The method of claim 3, further comprising:
   dividing, at the main thread, an initial work unit into the second work unit and a third work unit; and
   processing the third work unit at the main thread.

5. The method of claim 4, further comprising:
   receiving, at the main thread, the second work unit as processed by the slave thread; and
   combining, at the main thread, the third work unit as processed by the main thread with the second work unit as processed by the slave thread.

6. The method of claim 1, wherein the elapsed time period does not satisfy the threshold time period, and the method further comprises:
   transitioning the slave thread from the sleep state to the spin-lock state in response to another wake-up message from the main thread; and
   transitioning the slave thread out of the spin-lock state to process a third work unit from the main thread.

7. An apparatus, comprising:
a processor system having a first processor configured to execute a main thread and a second processor configured to execute a slave thread;
a memory storing program instructions that when executed by the processor system are configured to:
obtain an initial work unit at the main thread;
divide the initial work unit into a first work unit and another work unit;
send, via a wake-up message, the first work unit from the main thread to the slave thread; and
process the other work unit at the main thread;
transition the slave thread from a sleep state to a spin-lock state in response to the wake-up message from the main thread;
transition the slave thread out of the spin-lock state to process the first work unit from the main thread;
determine, at the main thread, an elapsed time period until receipt of a second work unit for the slave thread before the receipt of the second work unit; and
transition the slave thread to the spin-lock state if the elapsed time period satisfies a threshold time period, or to the sleep state if the elapsed time period does not satisfy the threshold time period.

8. The apparatus of claim 7, wherein the processor system comprises a microprocessor, the first processor comprises a first core of the microprocessor, and the second processor comprises a second core of the microprocessor.

9. The apparatus of claim 7, wherein the first processor comprises a first microprocessor and the second processor comprises a second microprocessor.

10. The apparatus of claim 7, wherein the program instructions are further configured to:
receive, at the main thread, the first work unit as processed by the slave thread; and
combine, at the main thread, the other work unit as processed by the main thread with the first work unit as processed by the slave thread.

11. The apparatus of claim 7, wherein the elapsed time period satisfies the threshold time period, and the program instructions are further configured to:
send the second work unit from the main thread to the slave thread; and
transition the slave thread out of the spin-lock state to process the second work unit.

12. The apparatus of claim 7, wherein the elapsed time period does not satisfy the threshold time period, the program instructions are further configured to:
transition the slave thread from the sleep state to the spin-lock state in response to another wake-up message from the main thread; and
transition the slave thread out of the spin-lock state to process a third work unit from the main thread.

13. A non-transitory computer readable medium having instructions stored thereon that when executed by a processor system cause the processor system to perform a method of synchronizing a main thread and a slave thread, comprising:
obtaining an initial work unit at the main thread;
dividing the initial work unit into a first work unit and another work unit;
sending, via a wake-up message, the first work unit from the main thread to the slave thread; and
processing the other work unit at the main thread;
transitioning the slave thread from a sleep state to a spin-lock state in response to the wake-up message from the main thread;
transitioning the slave thread out of the spin-lock state to process the first work unit from the main thread;
determining, at the main thread, an elapsed time period until receipt of a second work unit for the slave thread, wherein the act of determining the elapsed time period is performed before the receipt of the second work unit; and
transitioning the slave thread to the spin-lock state if the elapsed time period satisfies a threshold time period, or to the sleep state if the elapsed time period does not satisfy the threshold time period.

14. The non-transitory computer readable medium of claim 13, further comprising:
receiving, at the main thread, the first work unit as processed by the slave thread; and
combining, at the main thread, the other work unit as processed by the main thread with the first work unit as processed by the slave thread.

15. The non-transitory computer readable medium of claim 13, wherein the elapsed time period satisfies the threshold time period, and the method further comprises:
sending the second work unit from the main thread to the slave thread; and
transitioning the slave thread out of the spin-lock state to process the second work unit.

16. The non-transitory computer readable medium of claim 15, further comprising:
dividing, at the main thread, an initial work unit into the second work unit and a third work unit; and
processing the third work unit at the main thread.

17. The non-transitory computer readable medium of claim 13, wherein the elapsed time period does not satisfy the threshold time period, and the method further comprises:
transitioning the slave thread from the sleep state to the spin-lock state in response to another wake-up message from the main thread; and
transitioning the slave thread out of the spin-lock state to process a third work unit from the main thread.

* * * * *